(12) United States Patent
Martin (10) Patent No.: US 10,698,707 B2
(45) Date of Patent: Jun. 30, 2020

(54) USING SALIENCE RANKINGS OF ENTITIES AND TASKS TO AID COMPUTER INTERPRETATION OF NATURAL LANGUAGE INPUT

(71) Applicant: Facebook, Inc., Menlo Park, CA (US)

(72) Inventor: Scott Martin, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 64 days.

(21) Appl. No.: 15/961,517

(22) Filed: Apr. 24, 2018

(65) Prior Publication Data

US 2019/0324779 A1 Oct. 24, 2019

(51) Int. Cl.
| | |
|---|---|
| *G06F 3/00* | (2006.01) |
| *G06F 9/451* | (2018.01) |
| *G06F 3/0481* | (2013.01) |
| *G06F 16/2457* | (2019.01) |
| *G06F 40/40* | (2020.01) |
| *H04L 29/08* | (2006.01) |

(52) U.S. Cl.
CPC ............ *G06F 9/453* (2018.02); *G06F 3/0481* (2013.01); *G06F 16/24575* (2019.01); *G06F 16/24578* (2019.01); *G06F 40/40* (2020.01); *H04L 67/306* (2013.01)

(58) Field of Classification Search
CPC .............. G06F 9/453; G06F 16/24575; F06F 16/24575
USPC ......................................... 715/705, 708, 712
See application file for complete search history.

(56) References Cited

U.S. PATENT DOCUMENTS

| | | |
|---|---|---|
| 2012/0016678 A1 | 1/2012 | Gruber et al. |
| 2014/0040281 A1 | 2/2014 | Spivak et al. |
| 2016/0154792 A1 | 6/2016 | Sarikaya et al. |
| 2016/0225370 A1* | 8/2016 | Kannan .................. G10L 15/22 |

FOREIGN PATENT DOCUMENTS

WO  WO 2016/108873 A1  7/2016

OTHER PUBLICATIONS

PCT International Search Report and Opinion, PCT Application No. PCT/US2018/030390, dated Jan. 16, 2019, twenty pages.

* cited by examiner

*Primary Examiner* — Andrey Belousov
(74) *Attorney, Agent, or Firm* — Fenwick & West LLP (57) ABSTRACT

A computing device receives a message that is part of a session. The message includes natural language content derived from input by a user. The computing device analyzes the natural language content to determine an intent corresponding to a given task the user desires the computing device to perform. The analyzing is based on a ranked list of tasks that indicates the current relevance of tasks in the session. A definition for the given task that includes an entity slot is retrieved from a data store and a specific entity is assigned to the slot based on a ranked list of entities that indicates current relevance of the entities in the session. The computing device invokes an agent to perform the given task based on the specific entity assigned to the entity slot.

20 Claims, 6 Drawing Sheets

USING SALIENCE RANKINGS OF ENTITIES AND TASKS TO AID COMPUTER INTERPRETATION OF NATURAL LANGUAGE INPUT

BACKGROUND

This disclosure relates generally to computer user interfaces and in particular to natural language-based computer interfaces.

As the availability of computing power has gone up, while the size of computing devices and associated costs have gone down, the range of uses for computing devices has increased. One area of recent growth has been virtual assistants, which are now available on many smartphones as well as through stand-alone devices. Virtual assistants interact with users to assist them in completing various tasks. For example, rather than a user opening a web browser, typing a request for the weather in the user's hometown, selecting a search result, and scrolling through the resulting webpage to determine that day's forecast, the user might just ask the assistant "what's the weather going to be like tomorrow in San Francisco?" with the intent that the virtual assistant will provide a summary of the weather forecast in response.

However, existing computer systems often struggle to correctly interpret natural language input. Where a human might rely on context and "common sense" to interpret a statement, existing computer systems often misinterpret requests, or fail to recognize them as requests at all. This leads to wasted time and frustration, as the user has to reframe the request in a more explicit way. It may even lead to the user to giving up on the natural language interface altogether and reverting to other forms of input. Improving natural language processing may improve the speed, accuracy, and usability of computer systems. This may also enable expanded and improved functionality for computerized virtual assistants, as well as other computing systems with which humans interact.

SUMMARY

A computing device (e.g., a virtual assistant) performs tasks in response to messages received from a user. The computing device uses ranked lists of actions and entities in interpreting the messages it receives. The ranked list of actions indicates the current relevance of the ranked actions in a session. Similarly, the ranked list of entities indicates the current relevance of the ranked entities in the session.

In one embodiment, the computing device receives a message that is part of the session. The message includes natural language content derived from input by the user. The computing device analyzes the natural language content based on the ranked list of tasks to determine an intent of the user, which corresponds to a task the user wishes the computing device to perform. The computing device retrieves a definition of the task from a data store that includes a slot for an entity and assigns a specific entity to the slot based on the ranked list of entities. The computing device invokes an agent to perform the task based on the entity assigned to the slot.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

When humans communicate, they do not view individual statements in isolation. Rather, a statement is interpreted in view of the context of the conversation, as well as prior conversations between the individuals and broader social experiences. For example, consider the following conversation:

Person X: Want to have a BBQ at my place tomorrow?
Person Y: What will the weather be like?
Person X: It's meant to be sunny and about 70 degrees.

In the conversation, Person Y did not explicitly state a time or place. Even so, Person X inferred that Person Y wished to know the weather forecast for tomorrow (the time proposed for the BBQ in the previous statement) and the town is which Person X lives (knowledge inferred from previous discussions). The extent to which human communication relies on such linguistic shortcuts presents a challenge for interpreting natural language input by computers, which traditionally interpret each input statement individually. However, human users expect to be able to converse with a computerized virtual assistant in a similar manner to a human assistant. Thus, approaches that enable a computer to automatically and correctly interpret such statements may significantly improve the quality and efficiency of interactions with virtual assistants, thus increasing the utility of such technology to the user. Such approaches may also improve the utility of other computer-based technology where natural language input is desirable.

In various embodiments, a user engages in a conversation with a virtual assistant. The conversation may be verbal, in text, or use a mixture of the two. In some instances, other forms of media may be included, such as images and video. The virtual assistant maintains a pair of salience ranking lists: one for entities and one for tasks. The entity rankings and task rankings indicate a current relevance of entities and tasks, respectively, to the current conversation. The virtual assistant interprets messages received from the user based on the salience rankings list. Thus, the virtual assistant may successfully resolve ambiguous and implied references to entities or tasks. After each turn of the conversation (e.g., when the user or the virtual assistant has sent a new message), the virtual assistant updates the salience ranking lists based on the content of the message.

System Architecture

Figure 1:
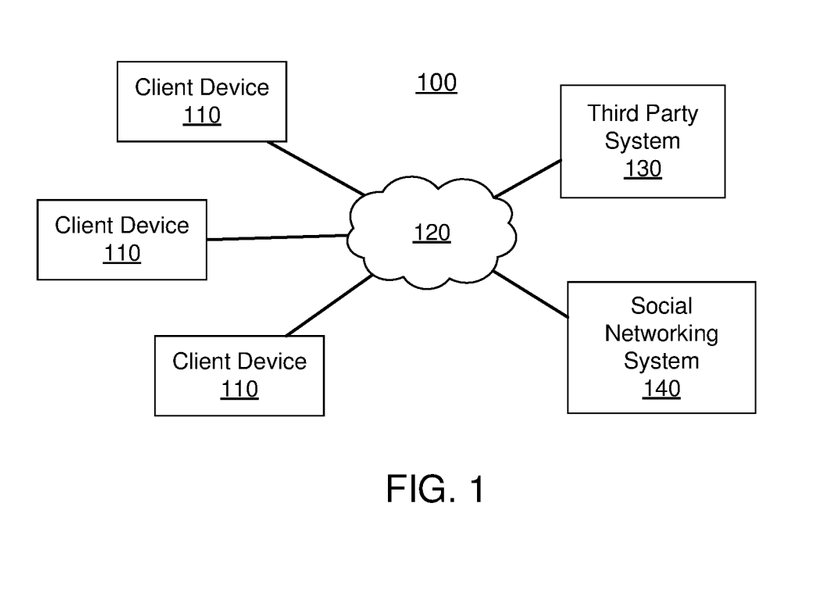
FIG. 1 is a block diagram of a system environment in which a virtual assistant operates, in accordance with an embodiment.

FIG. 1 is a block diagram of a system environment 100 for an online system 140 (e.g., a social networking system). The system environment 100 shown by FIG. 1 comprises one or more client devices 110, a network 120, one or more third-party systems 130, and the online system 140. In alternative configurations, different and/or additional components may be included in the system environment 100. For example, the online system 140 may alternatively be a content sharing network or another system providing content to users.

The client devices 110 are one or more computing devices capable of receiving user input as well as transmitting and/or receiving data via the network 120. The client devices 110 may execute or interact with the virtual assistant 230. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a tablet, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network XX20 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
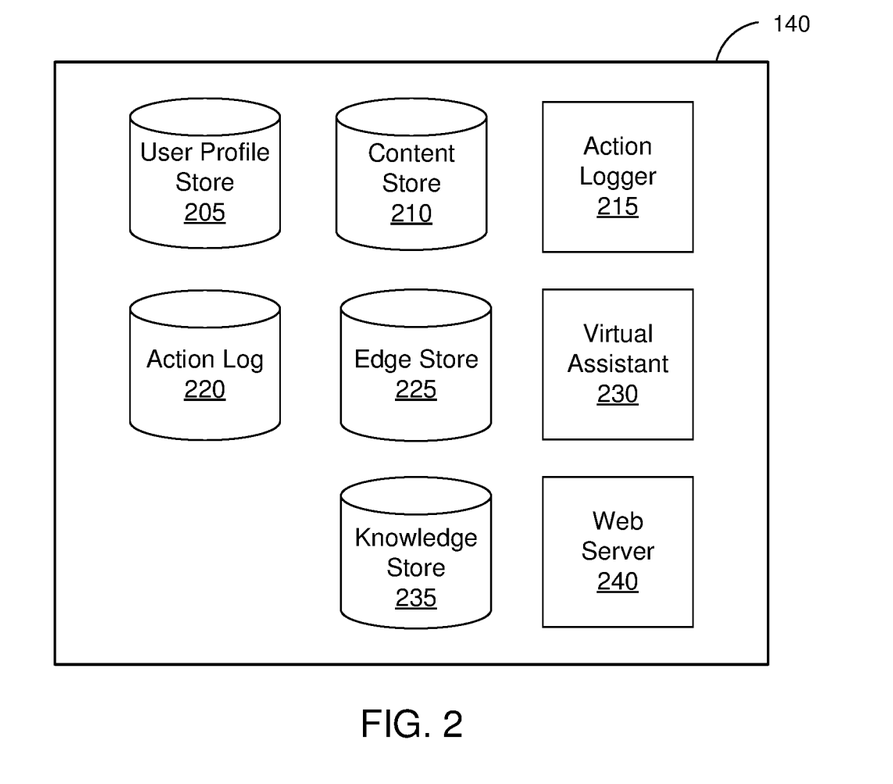
FIG. 2 is a block diagram of the online system shown in FIG. 1, in accordance with an embodiment.

FIG. 2 is a block diagram of an architecture of the online system 140, according to an embodiment. The online system 140 shown in FIG. 2 includes a user profile store 205, a content store 210, an action logger 215, an action log 220, an edge store 225, a virtual assistant 230, a knowledge store 235, and a web server 240. In other embodiments, the online system 140 may include additional, fewer, or different components for various applications. For example, some embodiments may omit the knowledge store 235. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system, as well as actions on third party systems 130 that communicate information to the online system. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that may be included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system. For example, an e-commerce website may recognize a user of an online system 140 through a social plug-in enabling the e-commerce website to identify the user of the online system. Because users of the online system 140 are uniquely identifiable, e-commerce websites, such as in the preceding example, may communicate information about a user's actions outside of the online system to the online system for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system, sharing a link with other users of the online system, and commenting on posts made by other users of the online system. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system based on the actions performed by the user. A user's affinity may be computed by the online system 140 over time to approximate the user's interest in an object, in a topic, or in another user in the online system based on actions performed by the user. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The virtual assistant 230 interacts with users via their client devices 110 to provide assistance with tasks. A user submits a request to the virtual assistant 230 via user input at a client device 110. In one embodiment, the virtual assistant 230 appears as a contact in a messaging application on the client device 110. In another embodiment, the user interacts with the virtual assistant 230 using a virtual assistant application on the client device 110. Alternatively, the virtual assistant 230 may be an application running on the client device 110.

The virtual assistant 230 maintains entity rankings and task rankings for a current session that it applies in interpreting messages received from the user. The current session may be the current conversation (e.g., any messages sent since the last period greater than a threshold length, such as five minutes, without any messages), the current calendar day, the last twenty-four hours, the last week, or any other time period. The current session may even be essentially infinite, including all messages exchanged between the user and the virtual assistant that are still available in the system environment 100. The user may also be able to define the session, such as by sending a "start new session" message to the virtual assistant 230. In some embodiments, what is considered the current session may depend on the type of messages involved in the current conversation. For example, the session for a verbal conversation might be limited to the current conversation whereas a text-based conversation might consider the session to be all messages exchanged within the last week, month, etc.

In one embodiment, the entity rankings are an ordered list of entities that have been referred to in the current session. An entity can be any tangible thing or intangible concept that the user (or the virtual assistant 230) has referred to in a message. Examples include people, locations, dates, times, objects, events, and the like. The virtual assistant 230 ranks the entities in the list based on various signals indicating the current relevance of the entity within the session.

In one embodiment, the task rankings are an ordered list of tasks that the user has asked the virtual assistant 230 to perform in the current session. Each task in the list corresponds to some action that the user might intend virtual assistant 230 to perform when sending it a message. Like entities, the tasks in the list are ranked based on signals indicative of current relevance within the session. Various embodiments of the virtual assistant 230 and the signals used to determine the rankings of entities and tasks, as well as how these rankings are used to more effectively service user intents, are described in greater detail, with reference to FIG. 5.

Figure 3:
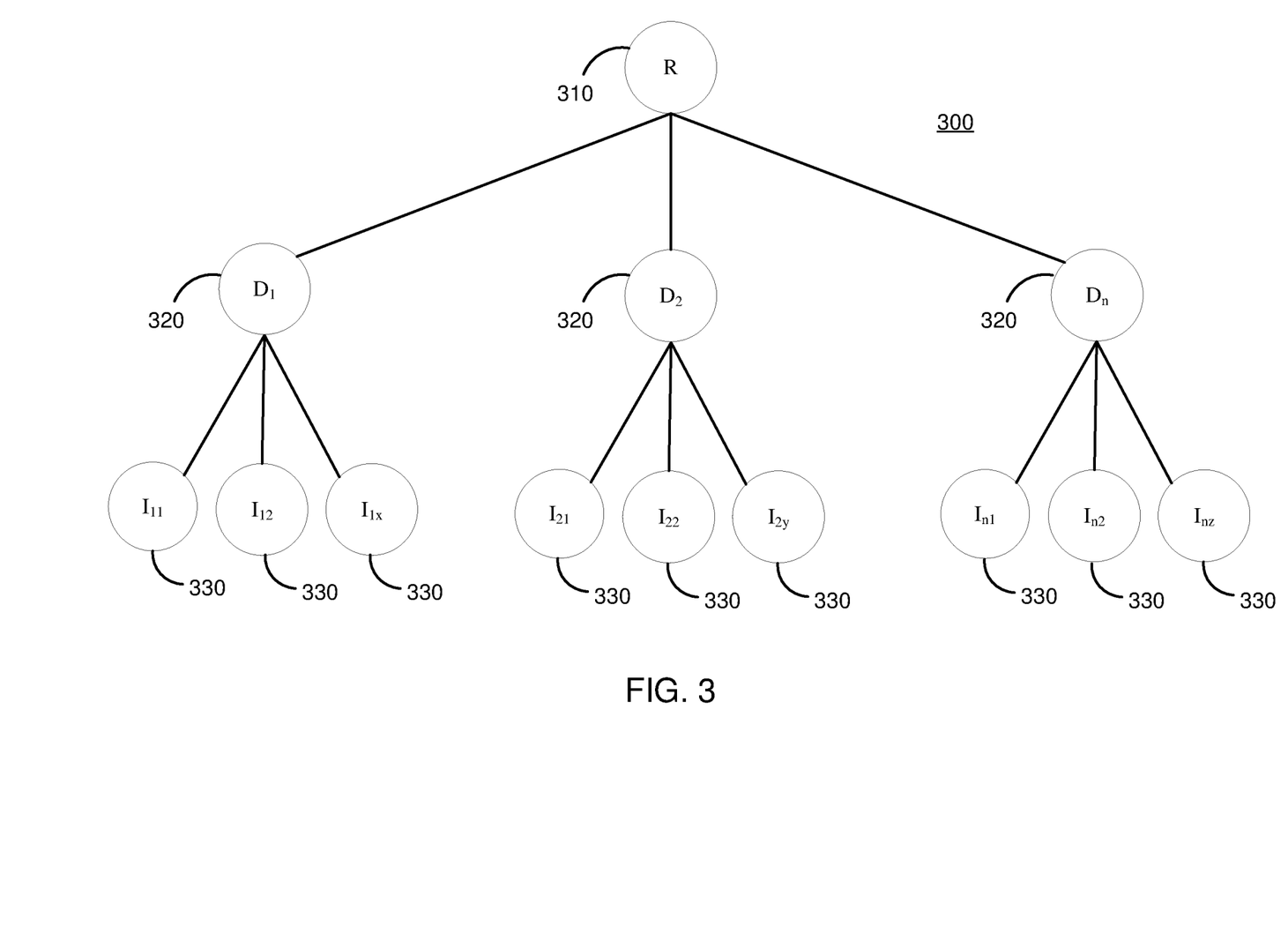
FIG. 3 is a block diagram illustrating an ontology of intents used by a virtual assistant system, in accordance with an embodiment.

FIG. 3 illustrates one embodiment of an ontology 300 of user intents. When a user sends a message to the virtual assistant 230, the user intends for the virtual assistant to perform a particular task. The virtual assistant 230 analyzes the message to determine the intent the user had for the message. In other words, the intent of the message corresponds to a task for the virtual assistant to perform. Generally there is a one-to-one correspondence between intents (what the user intends for the virtual assistant 230 to do) and tasks (what the virtual assistant does). Thus, the ranked list of tasks can help the virtual assistant 230 determine the intent of the user. For example, it is more likely that the user intends the virtual assistant 230 to perform a highly ranked task (i.e., one that is currently very relevant within the session) than a low ranking task.

In the embodiment shown in FIG. 3, the intents are divided into domains in an ontology 300. The nodes in the ontology 300 may be represented by data objects (e.g., stored in the intent definitions store 580). In the embodiment shown, the ontology 300 has a root node 310 that serves as a reference for the entire ontology. Within the ontology 300 there are several domain nodes 320, labelled $D_1, D_2, \ldots, D_n$. A domain node 320 corresponds to a general class of tasks that a user may intend for the virtual assistant 230 to perform. For example, a first domain node 320 might be for transport services, a second domain node might be for communications services, etc. By arranging intents into domains, efficiency of the virtual assistant 230 may be improved. The hierarchical nature of the ontology 300 means that the virtual assistant 230 may first consider intents that are in the same class as the intents corresponding to recently performed tasks.

Each domain node 320 corresponds to a set of intent nodes 330, labelled Iii, 112, etc. Different domains nodes 320 may correspond to different numbers of intent nodes 330. Each intent node 330 is a data object that defines how to perform corresponding task. For example, a domain node 320 for organizing transport services might be linked to intent nodes 330 for booking a cab, looking up a bus schedule, checking live flight arrival times, etc.

Figure 4:
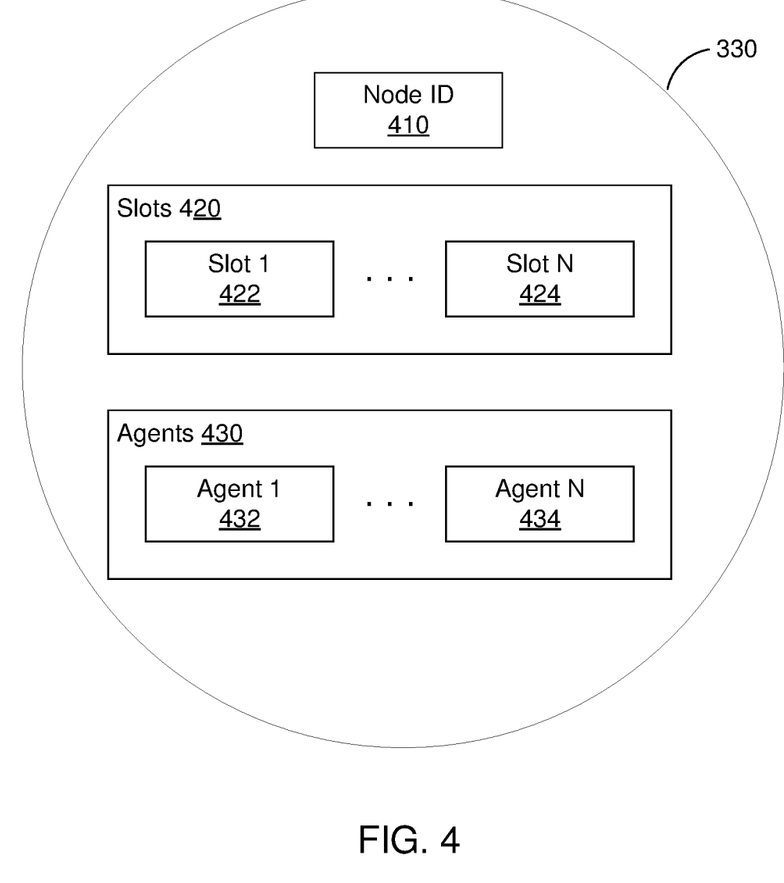
FIG. 4 is a block diagram illustrating an intent node in the ontology shown in FIG. 3, in accordance with an embodiment.

FIG. 4 shows one embodiment of an intent node 330. The intent node 330 includes a node ID 410, one or more slots 420, and one or more agents 430. In the embodiment shown, the slots 420 include a first slot 422 through an Nth slot 424 and the agents 430 include a first agent 432 through an Nth agent 434. However, in some embodiments, the intent node 330 may include a single slot 420 and/or agent 430. An intent node 330 may be viewed as a task definition defining how a virtual assistant 230 may perform the task corresponding to the intent. In other embodiments, an intent node may include different or additional elements.

The node ID 410 identifies the node in the ontology 300. The node ID 410 may be a globally unique identifying number, an identifier of the corresponding domain node 320 and an identifying number within the name, a text string with a name of the node, or the like.

The slots 420 are variables to which the virtual assistant 230 assigns entities based on the interactions with the user and/or other available information. In one embodiment, each slot has a type corresponding to the type of entity that will fill it. Slot types include people, locations, dates, times, objects, events, and the like. Slots may have sub-types or types that overlap in scope (e.g., there may be a general "time period" slot type that can hold times, days, weeks, months, etc. and also individual slot types for times, days, weeks, months, etc.) To give an example, the slots 420 of an intent node 330 for the task of getting a weather forecast might include a location slot, a day (or range of days) slot, and a forecast granularity slot. When filled, the location slot indicates the location for which the user desires the forecast, the day slot indicates the period for which the user desires the forecast, and the forecast granularity slot indicates how detailed the forecast should be (e.g., hourly, per day, etc.). In other words, if the task is viewed as a function for the virtual assistant 230 to execute, the slots 420 are analogous to the arguments of that function.

The agents 430 fulfil the task that the intent node 330 is intended to serve. For example, if the task of an intent node 330 is to make reservations at a restaurant, the agents 430 could be applications and/or functions that submit the relevant information (day, time, number of diners, etc.) to an online booking system of the restaurant. In one embodiment, an agent (e.g., the first agent 432) is built into the intent node directly 330. In other words, the agent is a function or program that performs the desired task. In another embodiment, the agent is a pointer or other reference to a program or function that can perform the intended task. Thus, when the agent is invoked, the relevant information is sent to the agent using the pointer or reference. This may allow for the agents 430 to be updated independently from virtual assistant 230 and/or allow for third parties to provide agents to service particular intents (e.g., via a third party server 130).

Referring again to FIG. 2, the knowledge store 235 stores information that is known or assumed to be factual, according to one embodiment. This is information that the virtual assistant 230 may use to provide additional context for or generate responses to requests received from a user. In contrast to the edge store 225, which stores information about connections users and other objects that can be used as a proxy for real world connections, the knowledge store 235 stores information established from the real world. For example, if the user asks "what sci-fi movies are playing in theaters right now?" the virtual assistant 230 might retrieve a list of movie screenings from a third party system 130 and determine which of those movies are sci-fi movies based on genre information in the knowledge store 235.

The web server 240 links the online system 140 via the network 120 to the one or more client devices 110, as well as to the one or more third party systems 130. The web server 240 serves web pages, as well as other content, such as JAVA®, FLASH®, XML, and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Example Virtual Assistant

Figure 5:
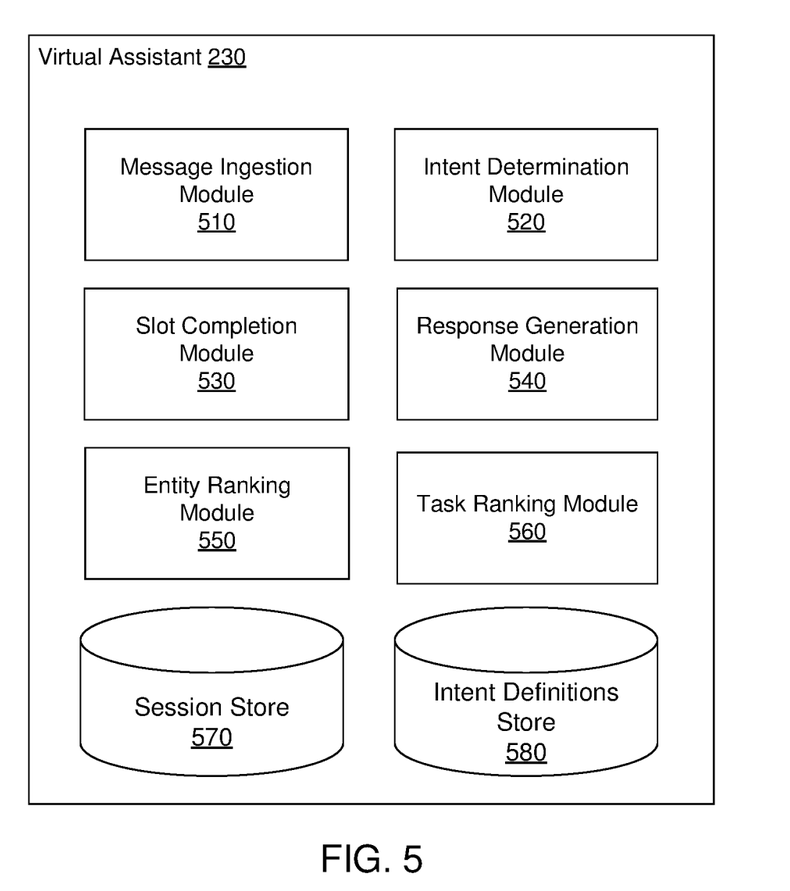
FIG. 5 is a block diagram of the virtual assistant shown in FIG. 2, in accordance with an embodiment.

FIG. 5 shows one embodiment of the virtual assistant 230. In the embodiment shown, the virtual assistant 230 includes a message ingestion module 510, an intent determination module 520, a slot completion module 530, a response generation module 540, an entity ranking module 550, a task ranking module 560, a session store 570, and a task definitions store 580. In other embodiments, the virtual assistant 230 contains different and/or additional elements. In addition, the functions may be distributed among the elements in a different manner than described.

The message ingestion module 510 receives messages from the client device 110 of the user. A message includes content derived from user input. The content may be natural language content. In one embodiment, the user may create messages by entering text or with verbal utterances. If the user enters text, the message may be a copy of the text entered by the user. If the user makes a verbal utterance, the message may include an audio recording of the utterance. The message ingestion module 510 converts the audio recording to text with a speech-to-text algorithm. Alternatively, the recording may be converted to text by the client device 110 before it is sent to the virtual assistant 230. The message ingestion module 510 may also store a copy of the message (e.g., in the session store 570). Alternatively, the message may be stored later in the process (e.g., after a response has been generated).

The message ingestion module 510 parses the message to identify references to entities. In one embodiment, the message ingestion module 510 uses syntactic processing to identify words or groups of words that correspond to entities and the types of those entities. The message ingestion module 510 may also compare words in the message to an entities dictionary that includes known entities and one or more types for the entities. For example, the words "San Francisco" can be identified as a location type entity, the city of San Francisco, by comparison with a list of cities. If the message contains ambiguous references to entities, the message ingestion module 510 flags them as ambiguous. It may still be able to assign a type to the entity. For example, the pronouns "him" and "her" refer to a person-type entity, but the identity of the person is treated as ambiguous at this stage. Similarly, the word "there" is unambiguously a reference to a location-type entity, but the identity of the location is treated as ambiguous.

If the message is the first in a new session (e.g., it was preceded by a new session request or the previous message was more than a threshold amount of time in the past, etc.), the message ingestion module 510 creates new ranked lists of entities and tasks (e.g., in the session store 570). In one embodiment, the intent list is initially empty and the entities list includes just those entities that were unambiguously referenced in the message. The entities may be initially ranked in a random order, or they may be ordered based on information independent from the current session, such as user profile data indicating connections between the user and one or more of the entities. These connections may indicate the relevance of those entities to the user. For example, if the message mentions both San Francisco and New York, and the user's profile indicates the user lives in San Francisco, San Francisco may initially be ranked above New York. In another embodiment, the initial rankings may be seeded with other entities and/or actions based on information that is independent from the session, such as the user's profile. For example, entities that the user has liked or is otherwise connected with on a social network may be included in the ranked list of entities.

If the message is not the first message in the session, any entities referenced that are not already on the list of entities may be added. In one embodiment, referenced entities that are not already on the ranked list are added at the bottom (i.e., with the lowest rank). Thus, when the ranked list is re-ranked after the message is processed (as described below, with reference to the entity ranking module 550), the newly referenced entities will be on the list and will likely move up in ranking due to having been referenced in the most recent message. Alternatively, the message ingestion module 510 may call the entity ranking module 550 to rank the entities before the message is processed further. This means that unambiguous references to entities in the current message may be used to help disambiguate other references in the message.

The intent determination module 520 analyzes messages received by the virtual assistant 230 to determine the intent of the user based on the ranked list of tasks. In various embodiments, the intent determination module 520 steps through the ranked list of tasks (e.g., starting with the highest ranked task) and looks for a match based on the references to entities identified in the message. To determine whether a task matches the user's intent, the intent determination module 520 retrieves the intent node 430 corresponding to the task (e.g., from intent definitions storage 580) and compares the types of the slots 420 of the node with the types of the entities identified in the message.

In one embodiment, the intent determination module 520 determines whether all of the slots 420 can be filled by an entity of the appropriate type referenced in the message (either ambiguously or unambiguously). If so, the intent corresponding to that task is assigned to the message. If not, the intent determination module 520 considers the next most highly ranked task to determine whether it is a match, and so on, until a match is found or the end of the ranked list of tasks is reached. If the end of the ranked list of tasks is reached without finding a match, the intent determination module 520 sends a message to the user's client device 110 requesting clarification of the user's intent. For example, the message might state "I'm sorry, I didn't understand that. Please ask again."

In another embodiment, the intent determination module 520 also considers whether some or all of the slots 420 can be filled inferentially based on the ranked list of entities. If the message does not include an entity of the appropriate type to fill a slot 420, but there is an appropriate entity in the ranked list of entities, the intent determination module 520 fills the slot with that entity. In this case, the intent determination module 520 generates a confidence value indicating how likely it is that the task being considered corresponds to the intent of the user. If the confidence value exceeds an intent confidence threshold (e.g., 85%), the intent determination module 520 may assign that intent to the message.

Alternatively, the intent determination module 520 may calculate a confidence value for some (e.g., the top five) or all of the other tasks in the ranked list. The confidence values are calculated by combining the ranking of the task with the degree to which the identified entities match the slots 420 for the intent corresponding to the task. For example, each intent under consideration may be assigned a composite ranking based on the fitness of the task for the intent based on the message and a score for the fitness of each of the identified entities for one of the slots in the intent. These entity/slot compatibility scores may be determined heuristically or via machine-learned weights. In either case, features such as the slot and entity types may be considered, along with the position of the entity in the ranked list. If no task has a confidence value that exceeds the intent confidence threshold or more than one task has a confidence value exceeding the threshold, the intent determination module 520 sends a message to the user's client device 110 asking for clarification. The message may identify the most likely task (e.g., the one with the highest confidence value or the one with the highest ranking) and ask for confirmation. For example, the message might read "Do you want me to get you the weather forecast for tomorrow in San Francisco?"

In some embodiments, the intent determination module 520 starts from the presumption that the current intent will be in the same domain as the intent corresponding to the previous task performed by the virtual assistant 230 (e.g., as indicated in the session store 570). The intent determination module 520 identifies the domain of the previous task (e.g., by querying the ontology for the node ID 410 corresponding to the previous task) and filters the ranked list of actions for those in the same domain. The intent determination module 520 considers actions corresponding to intents in that domain first (in ranked order). If no match is found in the current domain, the intent determination module 520 then considers actions from the ranked list corresponding to intents in other domains (again, in ranking order).

Assuming that a task has been selected, the slot completion module 530 fills in the slots 420 of the task definition (e.g., as retrieved from the corresponding intent node 330 in the intent definition storage 580) using the entities identified in the message and the ranked list of entities. This may involve resolving ambiguous references in the message (e.g., to whom does a pronoun refer?) and/or determining implicit references (e.g., in saying "what's the weather like?" the user wishes to know about the weather in the place he or she referenced in a previous message, or that was the result of a previous task).

In one embodiment, for each slot where the message includes an ambiguous reference or there is no suitable reference, the slot completion module 530 attempts to fill the slot based on the ranked list of entities. The slot completion module 530 steps through the ranked list of entities (starting with the highest ranked) and fills the slot with the first entity that has a type that matches the slot's type. The types of the entities may be stored in the ranked list or may be determined using syntactic analysis and/or an entities dictionary. For example, if the slot is for a location, then the highest ranked location in the list is selected. In another embodiment, the slot completion module 530 filters the ranked list of entities first to remove those that are not of an appropriate type for the slot. This may improve efficiency as highly ranked entities that are not of an appropriate type for the slot need not be considered. For example, if the slot is for a person, any entities in the ranked list that are not people need not be considered.

In some embodiments, the slot completion module 530 generates confidence values indicating how likely it is that some (e.g., the top five ranked entities) or all of the entities in the ranked list match the slot. The confidence value for an entity may be calculated by combining the ranking of the entity, a score generated from syntactic analysis of the message, and/or information that is independent from the current session (e.g., user profile data). For example, in the case of a location entity, the confidence values may be derived from geographic proximity to a current location of the user that sent the message. In the case of a person entity, the confidence values may be derived from the relationship between the user and the entity in question (e.g., as indicated in a social graph edge). The confidence values may also be influenced by how recently the entity in question has been mentioned as well as how many times it has been mentioned in the current conversational thread. These values may either be determined heuristically or via weights obtained from a machine-learned model. If no entity has a confidence value that exceeds an entity confidence threshold (e.g., 85%), the slot completion module 530 sends a message to the user's client device 110 asking for clarification. The message may identify the most likely entity (e.g., the one with the highest confidence value or the highest ranking) and ask for confirmation. For example, the message might read "Are you referring to John Smith?" If two or more intents have confidence values that exceed the threshold, the slot completion module 530 may also request clarification from the user. For example, where the message from user referred to "John," the slot completion module 350 might send a message that reads "Are you referring to John Smith or John Jones?"

The response generation module 540 generates responses to messages received from the client device 110 of the user. In various embodiments, the response generation module 540 uses the intent determined by the intent determination module 540 and the slot values determined by the slot completion module 540 to identify an appropriate agent and formulate a request to that agent. As described previously, an intent node 330 in an intent ontology 300 may include a set of one or more agents 430. Where there is more than one agent that may serve the intent, the response generation module 540 may select one based on various considerations, including preferences of the user and the slot values.

In one embodiment, the response generation module 540 prompts the user to select an agent from the set of agents 430 the first time the user expresses that intent. In future, the response generation module 540 may automatically select the same agent unless the user expressly overrides the previous selection (e.g., by sending a message to the virtual assistant 230 requesting that the previous agent selection be forgotten). Alternatively or additionally, the response generation module 540 may consider specific slot values in selecting an agent. One agent in an intent node 330 may be preferable for servicing the intent in relation to one entity, while another agent may be preferable in relation to a different entity. For example, a first agent may be better (or preferred by the user) for making restaurant reservations in San Francisco while a second agent may be better (or preferred by the user) when making restaurant reservations in New York.

Regardless of how the agent is selected, the response generation module 540 invokes the selected agent using the values of the slots (as determined by the slot completion module 530) as input. In one embodiment, assuming the slot values define a viable invocation request, the agent returns the requested result. For example, if the agent is for obtaining weather information, it will return a weather forecast for the requested location at the requested time, etc. As another example, if the agent is for making restaurant reservations, it will return confirmation that the reservation has been made (assuming it was successful). In contrast, if the invocation request is not viable (e.g., because the virtual assistant 230 assigned an invalid value to one of the slots) or if the request cannot be fulfilled for some other reason (e.g., the request was for a restaurant reservation and no tables are available) then the agent may return an error.

The response generation module 540 creates a message to send to the user's client device 110 based on the result received from the agent. The response generation may use natural language generation techniques such that the content of the message is constructed in a way that is similar or identical to that which a human would create. If the agent successfully completed the intended task, the message may include details of the result (e.g., confirmation of a restaurant booking, a weather forecast, etc.). In contrast, if invocation of the agent failed, the message may seek clarification from the user as to what task the user wishes the virtual assistant 230 to perform. Alternatively, the invoked agent may return the result directly to the user's client device 110.

The entity ranking module 550 updates the ranked list of entities a session based on messages received by the virtual assistant 230 and/or responses sent to the user's client device 110 during that session. In one embodiment, the entity ranking module 550 ranks the entities in the list after each turn of a conversation (e.g., after each message is received and each response is sent). Alternatively, the ranking may be performed at other intervals, such as after each message sent by the user is processed. Regardless of the interval used, the entity ranking module 550 updates the ranked list by calculating ranking scores for the entities and ordering the entities based on the ranking scores.

In one embodiment, the entity ranking module 550 calculates the ranking score for each entity in the list based on a set of features. The set of features can include: a number of mentions of that entity during the current session; a measure of recency of the entity in the session (e.g., the number of turns since the last mention of the entity); profile information of the user indicating the importance of the entity to the user; contextual prominence of the entity (e.g., a number of mentions of the entity on a social network site in the last twenty-four hours, connections between the entity and other entities mentioned recently in the session, etc.); a frequency of interaction between the user and the entity in a messaging application (where the entity is of a type that has such an account); and a measure of how close the user is to the entity in a social network (e.g., where the entity is another user, how many friends and/or interests the user and the entity have in common on a social networking site). For example, the measure of how close the user is to a person entity with an account on the same social network could be derived by taking the number of connections shared by both the user and the entity in question and dividing it by the total number of connections of the user. In other embodiments, the set of features may include different or additional features.

Regardless of the specific features used, the entity ranking module 550 generates a ranking score for an entity based on the values of those features. In one embodiment, a set of heuristically predetermined weights are assigned to the features, with the score being the sum of the features multiplied by the corresponding weights. In another embodiment, a machine-learning model is used to determine the weight for each feature.

The machine-learning model may be trained using a set of training data. For example, a set of human operators might label training a set of conversations between a user and a virtual assistant with scores indicating the relative importance of various entities in the conversation. The model (e.g., a neural network) is trained (e.g., using a backpropagation algorithm) to produce scores for the training set that closely match the human-assigned scores. The model may then be validated by applying it to a second set of conversations and comparing the results to those assigned by the human-operators for the second set.

Regardless of the specific method used to generate the ranking scores, the entity ranking module 550 ranks the list of entities based on the ranking scores. The ranked list of entities provides a measure of how significant each entity currently is to the conversation, with higher ranking scores indicating that the entity is likely more significant and vice versa. A highly ranked entity (with a high ranking score) might have been mentioned several times, including in the most recent message, and the user may be connected in some way with the entity on a social network. Conversely, a lowly ranked entity (with a low ranking score) might have been mentioned only once several messages back in the conversation and have no other apparent connections to the user.

The task ranking module 560 operates similarly to the entity ranking module 550, but ranks tasks rather than entities. In one embodiment, the task ranking module 560 generates a ranking score for each task from a set of features that includes: a number of invocations of the task in the current session; a measure of recency for the task (e.g., the number of turns since the last invocation of the task); the percentage of the last n tasks invoked that were that task (where n is a positive integer, such as ten); the prominence of the task in the user's geographic area (e.g., how many times has the task been invoked in the user's ZIP code in the last week); the prominence of the task among other users associated with the user (e.g., the user's friends within a social network, the user's contacts in an instant messaging service, users who are share a messaging thread with the user and the virtual assistant 230, etc.); and a measure of the relevance of the task to the types of entities currently included in the entities list (or the top m ranked entities, where m is a positive integer, e.g., ten). For example, the relevance of the task to the types of entities currently included in the entities list may be determined by incrementing the score for the task for every entity in the ranked list whose type matches the type of a slot included in the definition of that task. The amount the score is incremented for a given entity may depend on the ranking of the entity. Higher-ranked entities can provide a larger increase in the score by applying a multiplier (e.g., the reciprocal of the entity's position in the ranked list). The contribution of each signal to the ranking score may be determined based on a predetermined heuristic weighting or using a machine-learning approach, as described previously with reference to the entity ranking module 550.

Regardless of how they are determined, the task ranking module 560 ranks the tasks based on the ranking scores. Thus, the ranked list of tasks provides a measure of how significant each task currently is to the conversation, with higher ranking scores indicating that the task is likely more significant and vice versa. For example, if the user asked about the weather tomorrow in a particular town and then asked about the price to stay at various hotels in the town that night, a "get hotel price" task might be highly ranked whereas a "get weather forecast" task might be lower ranked.

The session store 570 includes one or more computer-readable media configured to store information about the current session. In one embodiment, the information about the current session includes the ranked lists of entities and tasks as well as a copy of each message sent and received by the virtual assistant 230 in the session. The session store 570 may also store copies of messages exchanged during previous sessions. Although the session store 570 is shown as a single entity located within the virtual assistant 230, it may be located elsewhere and/or distributed across multiple computing devices. For example, the session store 570 may be a distributed database stored across multiple remote servers.

The intent definitions store 580 includes one or more computer-readable media configured to store information about the intents serviced by the virtual assistant 230. In one embodiment, the information about the intents is an intent hierarchy 300, such as the one shown in FIG. 3. Like the session store 570, the intent definitions store 580 may be remote from the virtual assistant and/or distributed across multiple computing devices. In addition, although the session store 570 and intent definitions store 580 are shown in FIG. 5 as distinct components, the corresponding functionality may be provided by a single database or other type of data store.

Example Computing System Architecture

Figure 6:
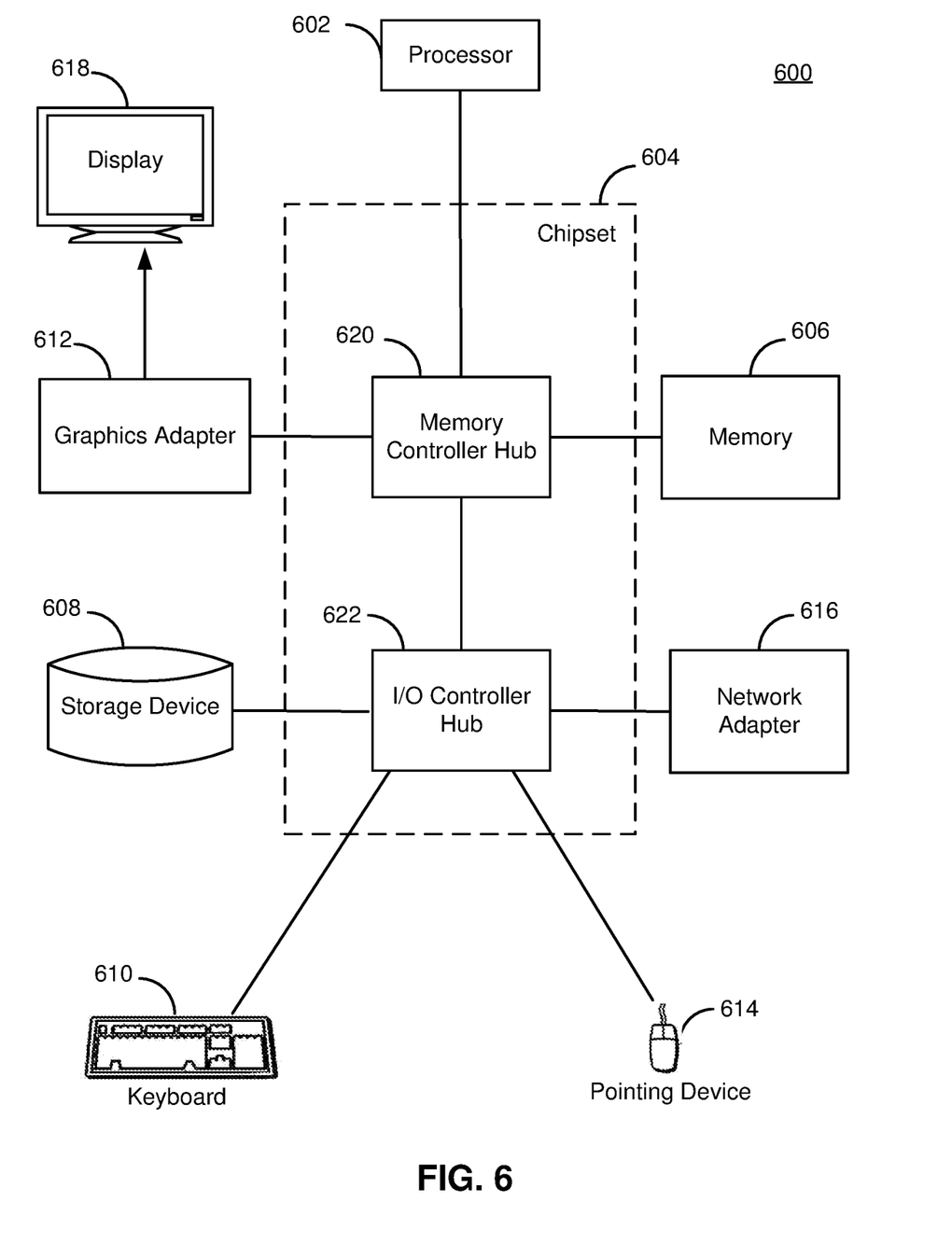
FIG. 6 illustrates a computer suitable for use in the system environment of FIG. 1, in accordance with an embodiment.

FIG. 6 is a high-level block diagram illustrating an example computer 600 suitable for use as a client device 110, third party system 130, or server in the online system 140. The example computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer 600 have different architectures.

In the embodiment shown in FIG. 6, the storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, touch-screen, or other type of pointing device, and is used in combination with the keyboard 610 (which may be an on-screen keyboard) to input data into the computer system 600. The graphics adapter 612 displays images and other information on the display 618. The network adapter 616 couples the computer system 400 to one or more computer networks.

The types of computers used by the entities of FIGS. 1, 2, and 5 can vary depending upon the embodiment and the processing power required by the entity. For example, the online system 140 might include a distributed database system comprising multiple blade servers working together to provide the functionality described. Furthermore, the computers can lack some of the components described above, such as keyboards 610, graphics adapters 612, and displays 618.

Example Method of Interpreting Human Input Using Salience Rankings

Figure 7:
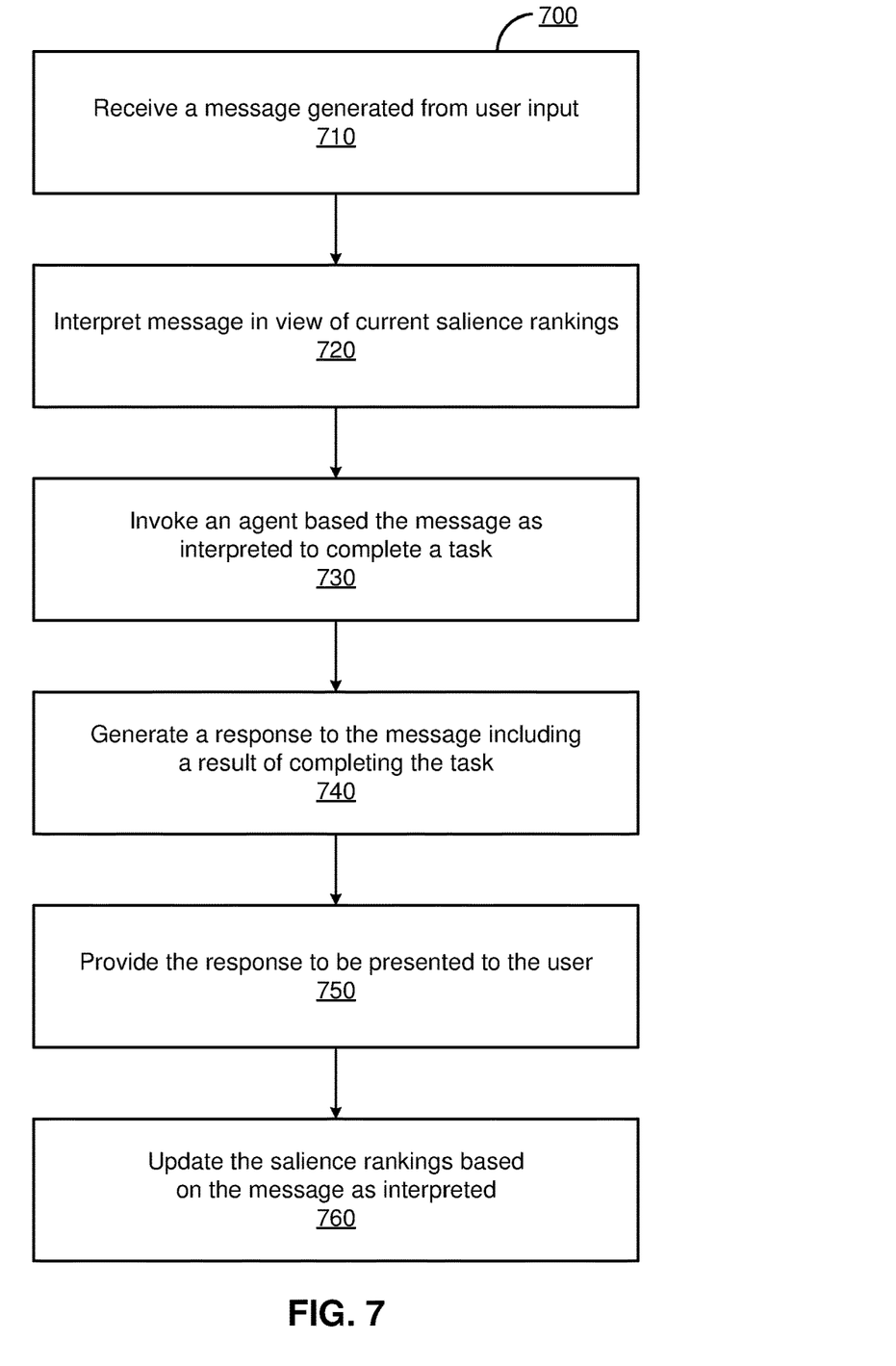
FIG. 7 is a flow chart illustrating a method for interpreting natural language input using salience rankings, in accordance with an embodiment.

FIG. 7 illustrates one embodiment of a method 700 for interpreting natural language input using salience rankings. The steps of FIG. 7 are illustrated from the perspective of the virtual assistant 230 performing the method. However, some or all of the steps may be performed by other entities and/or components. In addition, some embodiments may perform the steps in parallel, perform the steps in different orders, or perform different steps. For example, the virtual assistant may update the salience rankings based on a received message before or in parallel to generating a response to the message.

In the embodiment shown in FIG. 7, the method 700 begins with the virtual assistant 230 receiving 710 a message from a client device 110. The message includes content generated from user input. The content can include be text (e.g., typed on a keyboard) and/or audio data of the user talking (e.g., recorded by a microphone of the client device 110). Where the user input includes audio data, the virtual assistant 230 converts it to text (e.g., with a speech-to-text algorithm). The content may additionally include other types of media, such as images and video.

The virtual assistant 230 interprets 720 the message based on the current salience rankings. In one embodiment, the virtual assistant 230 determines the intent of the message based on a ranked list of tasks and resolves any ambiguous references to entities (pronouns, a name that matches more than entity, etc.) based on a ranked list of entities. As described previously, the ranked list of tasks indicates the relevance of each task to the current session. Similarly, the ranked list of entities indicates the relevance of different entities to the current session.

The virtual assistant 230 invokes 730 an agent to complete the task corresponding to the identified intent. In one embodiment, the virtual assistant 230 retrieves the intent's definition (e.g., from an intent definitions store 380), which defines how the assistant may perform corresponding task. The definition includes one or more slots to be filled by an entity. The virtual assistant fills the slots based on the ranked list of entities and invokes 730 the agent to complete the task. The specific agent to invoke may be included or identified in the definition. The agent completes the task and returns the result to the virtual assistant 230.

The virtual assistant 230 generates 740 a response to the message. The response includes the result returned by the agent. Alternatively, the agent may return the result directly to the user's client device 110. The virtual assistant 230 provides 750 the response for presentation to the user. In one embodiment, providing 750 the response includes sending the response to a client device 110 associated with the user (e.g., the device from which the message was received). The client device 110 then displays the result of invoking the agent to the user (e.g., by displaying it within an app with which the user communicates with the virtual assistant 230).

The virtual assistant 230 also updates 760 the salience rankings based on the received message, as interpreted 720. In one embodiment, the virtual assistant 230 adds the message to the session history (e.g., as stored in the session store 570) and re-ranks the lists of tasks and entities. In another embodiment, the virtual assistant 230 adjusts just the ranking scores of the task performed in the current turn and any entities referenced in the message. This may be more efficient as less calculation is required, but may also reduce accuracy of the rankings overall. In such an embodiment, the virtual assistant may periodically (e.g., every ten turns) recalculate the ranked lists entirely to balance efficiency with accuracy.

A user interface using the described salience rankings can provide several advantages. One such advantage is improved intent-level disambiguation. This arises where the user asks about an entity that could be one of several things (e.g., a book, a play, or a movie, all with the same title). The task rankings can assist the virtual assistant 230 in correctly identifying the correct identity without having to seek explicit clarification from the user. For example, if the user has recently asked about two other books, it is most likely that the intent of the ambiguous request was also to ask about a book, not a play or movie. Thus, the efficiency of the user interface can be improved as the virtual assistant 230 may make less mistakes in interpreting requests and/or may not need to request clarification from the user as often.

Another advantage is improved coreference resolution. This arises where the dialog has recently included references to two entities and the user then makes a request including a pronoun. The entity rankings can improve the ability of the virtual assistant 230 to correctly determine which entity the user is referring to. This may be the case even where the most recent reference was to the incorrect entity if the sum of the session history indicates that the correct entity is more important to the overall conversation. Thus, as with intent-level disambiguation, the efficiency of the user interface may be improved.

A similar advantage that may be realized is slot carryover. This refers to a situation where the user has been asking about one thing and briefly segues to another before returning to the first topic. For example, the user might ask several questions about a restaurant, then ask whether it will be raining that night, and then ask "are there any gluten-free options?" A human easily interprets the last question as referring to the restaurant not the weather forecast for the corresponding location. The entity rankings may enable the virtual assistant 230 to correctly determine the user's intent because the overall prominence of the restaurant in the session history may override the more recent reference to the weather. Similarly, the ranked list of tasks may enable the virtual assistant 230 to successfully interpret the user returning to a previous intent after a brief interlude into another topic. For example, if the user requests a list of available hotels in various ski resorts, then asks about the weather at one of the ski resorts, and then asks "how about Tahoe?" the virtual assistant 230 may correctly interpret this as a request for hotel availability, not a request about the weather, based on the overall prominence of the hotel availability task in the session history. Therefore, the efficiency of the user interface may be improved. The user can submit requests in an abbreviated, natural language form and the virtual assistant may require less clarifications and/or make less errors.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:
1. A method comprising:
  facilitating a communication session including existing messages between a user and a virtual assistant;
  maintaining a ranked list of tasks for the communication session, the ranked list of tasks indicating, based on the existing messages, a current relevance of the tasks to the communication session, wherein the ranked list of tasks is updated as messages are added to the existing messages;
  maintaining a ranked list of entities for the communication session, the ranked list of entities indicating, based on the existing messages, a current relevance of the entities to the communication session, wherein the ranked list of entities is updated as messages are added to the existing messages;

receiving, at a computing device, a new message that is part of the communication session, the message and including natural language content derived from input by a user;

analyzing the natural language content to determine an intent, the intent corresponding to a given task the user desires the computing device to perform, the analyzing based on the ranked list of tasks that indicates the current relevance of the tasks to the communication session;

retrieving, from a data store, a definition for the given task, the definition including an entity slot;

assigning a specific entity to the entity slot based on the ranked list of entities that indicates current relevance of the entities to the communication session; and invoking an agent to perform the given task, the agent performing the given task based on the specific entity assigned to the entity slot.

2. The method of claim 1, further comprising updating the ranked list of tasks based on the new message, updating the ranked list of tasks including:
   adding the new message to the existing messages; and
   generating a ranking score for a task based on a plurality of features, the plurality of features including a number of invocations of the task in the existing messages and a measure of recency for the task in the communication session.

3. The method of claim 1, wherein determining the intent comprises:
   calculating confidence values for a plurality of tasks that includes the given task, each confidence value indicating a likelihood that the corresponding task corresponds to the intent; and
   selecting the given task based on the confidence values.

4. The method of claim 1, wherein determining the intent comprises:
   calculating confidence values for a plurality of tasks, each confidence value indicating a likelihood that the corresponding task corresponds to the intent; and
   sending a request to a computing device of the user responsive to none of the confidence values exceeding an intent confidence threshold, the request asking the user to clarify the intent.

5. The method of claim 1, wherein the entity slot has a slot type and assigning the specific entity to the entity slot comprises:
   considering entities in the ranked list of entities in rank order; and
   selecting, as the specific entity, a highest-ranked entity that has an entity type that matches the slot type.

6. The method of claim 1, the method further comprising updating the ranked list of entities based on the new message, updating the ranked list of entities including:
   adding the new message to the existing messages; and
   generating a ranking score for an entity based on a plurality of features, the plurality of features including a number of mentions of the entity in the existing messages and a measure of recency for the entity in the communication session.

7. The method of claim 6, wherein the plurality of features further includes information about the user that is independent from the communication session, the information about the user indicating a relevance of the entity to the user.

8. A non-transitory computer-readable medium storing computer program instructions executable by a processor to perform operations comprising:

facilitating a communication session including an exchange of messages between a user and a virtual assistant;

maintaining a ranked list of tasks for the communication session, the ranked list of tasks indicating current relevance of the tasks to the communication session, wherein the ranked list of tasks is updated as new messages are added to the communication session;

maintaining a ranked list of entities for the communication session, the ranked list of entities indicating current relevance of the entities to the communication session, wherein the ranked list of entities is updated as new messages are added to the communication session;

receiving, at a computing device, a message that is part of the communication session, the message including natural language content derived from input by a user;

analyzing the natural language content to determine an intent, the intent corresponding to a given task the user desires the computing device to perform, the analyzing based on the ranked list of tasks that indicates the current relevance of the tasks to the communication session;

retrieving, from a data store, a definition for the given task, the definition including an entity slot;

assigning a specific entity to the entity slot based on the ranked list of entities that indicates current relevance of the entities to the communication session; and invoking an agent to perform the given task, the agent performing the given task based on the specific entity assigned to the entity slot.

9. The non-transitory computer-readable medium of claim 8, wherein the operations further comprise updating the ranked list of tasks based on the new message, updating the ranked list of tasks including:
   adding the new message to the existing messages; and
   generating a ranking score for a task based on a plurality of features, the plurality of features including a number of invocations of the task in the existing messages and a measure of recency for the task in the communication session.

10. The non-transitory computer-readable medium of claim 8, wherein determining the intent comprises:
    calculating confidence values for a plurality of tasks that includes the given task, each confidence value indicating a likelihood that the corresponding task corresponds to the intent; and
    selecting the given task based on the confidence values.

11. The non-transitory computer-readable medium of claim 8, wherein determining the intent comprises:
    calculating confidence values for a plurality of tasks, each confidence value indicating a likelihood that the corresponding task corresponds to the intent; and
    sending a request to a computing device of the user responsive to none of the confidence values exceeding an intent confidence threshold, the request asking the user to clarify the intent.

12. The non-transitory computer-readable medium of claim 8, wherein the entity slot has a slot type and assigning the specific entity to the entity slot comprises:
    considering entities in the ranked list of entities in rank order; and
    selecting, as the specific entity, a highest-ranked entity that has an entity type that matches the slot type.

13. The non-transitory computer-readable medium of claim 8, wherein the operations further comprise updating the ranked list of entities based on the new message, updating the ranked list of entities including:

adding the new message to the existing messages; and generating a ranking score for an entity based on a plurality of features, the plurality of features including a number of mentions of the entity in the existing messages and a measure of recency for the entity in the communication session.

14. The non-transitory computer-readable medium of claim 13, wherein the plurality of features further includes information about the user that is independent from the communication session, the information about the user indicating a relevance of the entity to the user.

15. A computer system comprising:

one or more processors; and one or more computer readable media storing computer program instructions that, when executed, cause the one or more processors to perform operations including:

facilitating a communication session including an exchange of messages between a user and a virtual assistant;

maintaining a ranked list of tasks for the communication session, the ranked list of tasks indicating current relevance of the tasks to the communication session, wherein the ranked list of tasks is updated as new messages are added to the communication session;

maintaining a ranked list of entities for the communication session, the ranked list of entities indicating current relevance of the entities to the communication session, wherein the ranked list of entities is updated as new messages are added to the communication session;

receiving, at a computing device, a message that is part of the communication session, the message including natural language content derived from input by a user;

analyzing the natural language content to determine an intent, the intent corresponding to a given task the user desires the computing device to perform, the analyzing based on the ranked list of tasks that indicates the current relevance of the tasks to the communication session;

retrieving, from a data store, a definition for the given task, the definition including an entity slot;

assigning a specific entity to the entity slot based on the ranked list of entities that indicates current relevance of the entities to the communication session; and invoking an agent to perform the given task, the agent performing the given task based on the specific entity assigned to the entity slot.

16. The computer system of claim 15, wherein the operations further include updating the ranked list of tasks based on the new message, updating the ranked list of tasks including:

adding the new message to the existing messages; and generating a ranking score for a task based on a plurality of features, the plurality of features including a number of invocations of the task in the existing messages and a measure of recency for the task in the communication session.

17. The computer system of claim 15, wherein determining the intent comprises:

calculating confidence values for a plurality of tasks that includes the given task, each confidence value indicating a likelihood that the corresponding task corresponds to the intent; and selecting the given task based on the confidence values.

18. The computer system of claim 15, wherein determining the intent comprises:

calculating confidence values for a plurality of tasks, each confidence value indicating a likelihood that the corresponding task corresponds to the intent; and sending a request to a computing device of the user responsive to none of the confidence values exceeding an intent confidence threshold, the request asking the user to clarify the intent.

19. The computer system of claim 15, wherein the entity slot has a slot type and assigning the specific entity to the entity slot comprises:

considering entities in the ranked list of entities in rank order; and selecting, as the specific entity, a highest-ranked entity that has an entity type that matches the slot type.

20. The computer system of claim 15, wherein the operations further include updating the ranked list of entities based on the new message, updating the ranked list of entities including:

adding the new message to the existing messages; and generating a ranking score for an entity based on a plurality of features, the plurality of features including a number of mentions of the entity in the existing messages, a measure of recency for the entity in the communication session, and information about the user that is independent from the communication session, the information about the user indicating a relevance of the entity to the user.

* * * * *

UNITED STATES PATENT AND TRADEMARK OFFICE
CERTIFICATE OF CORRECTION

PATENT NO. : 10,698,707 B2  
APPLICATION NO. : 15/961517  
DATED : June 30, 2020  
INVENTOR(S) : Scott Martin Page 1 of 1

It is certified that error appears in the above-identified patent and that said Letters Patent is hereby corrected as shown below:

In the Claims

Column 19, Line 2, In Claim 1, after "message", delete "and"

Signed and Sealed this  
Third Day of November, 2020

Andrei Iancu  
*Director of the United States Patent and Trademark Office*